United States Patent
Rau et al.

(10) Patent No.: US 8,625,280 B2
(45) Date of Patent: Jan. 7, 2014

(54) COOLING MEMORY MODULES USING COLD PLATE BLADES COUPLED TO THE MEMORY MODULES VIA CLIPS

(75) Inventors: Timothy Rau, Sacramento, CA (US); Glenn C. Simon, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 13/260,066

(22) PCT Filed: Oct. 30, 2009

(86) PCT No.: PCT/US2009/062748
§ 371 (c)(1),
(2), (4) Date: Sep. 23, 2011

(87) PCT Pub. No.: WO2011/053310
PCT Pub. Date: May 5, 2011

(65) Prior Publication Data
US 2012/0026670 A1  Feb. 2, 2012

(51) Int. Cl.
*H05K 7/20* (2006.01)
*H01L 23/34* (2006.01)

(52) U.S. Cl.
USPC .......................................... 361/699; 257/719

(58) Field of Classification Search
USPC .......................................... 361/699
See application file for complete search history.

(56) References Cited

U.S. PATENT DOCUMENTS

| | | | |
|---|---|---|---|
| 5,801,924 A * | 9/1998 | Salmonson .................... 361/719 |
| 7,342,797 B2 | 3/2008 | Kamath et al. |
| 7,408,776 B2 * | 8/2008 | Campbell et al. .............. 361/699 |
| 7,639,498 B2 * | 12/2009 | Campbell et al. .............. 361/699 |
| 8,004,841 B2 * | 8/2011 | Cipolla et al. ................. 361/699 |
| 8,059,406 B1 * | 11/2011 | Meyer et al. .................. 361/701 |
| 8,385,067 B2 * | 2/2013 | Arvelo et al. ................. 361/699 |
| 2004/0095721 A1 * | 5/2004 | Ellsworth et al. ............. 361/694 |
| 2008/0084668 A1 | 4/2008 | Campbell et al. |
| 2008/0264613 A1 | 10/2008 | Chu |
| 2008/0278916 A1 * | 11/2008 | Hsieh ............................ 361/711 |
| 2010/0085712 A1 | 4/2010 | Hrehor, Jr. et al. |
| 2012/0020004 A1 * | 1/2012 | Rau et al. .................. 361/679.31 |
| 2012/0281358 A1 * | 11/2012 | Chainer et al. ................ 361/700 |

OTHER PUBLICATIONS

International Search Report, PCT/US2009/062748, Jul. 20, 2010, 9 pages.

* cited by examiner

*Primary Examiner* — Gregory Thompson

(57) ABSTRACT

A cold plate has blades arranged to be interleaved with memory modules, with clips coupling blades to memory modules. A liquid cooling loop is thermally coupled to the blades of the cold plate.

9 Claims, 8 Drawing Sheets

COOLING MEMORY MODULES USING COLD PLATE BLADES COUPLED TO THE MEMORY MODULES VIA CLIPS

CROSS-REFERENCES TO RELATED APPLICATIONS

The present patent application is related to the following patent applications: A COLD PLATE HAVING BLADES THAT INTERLEAVE WITH MEMORY MODULES by Timothy Rau and Glenn C. Simon, PCT Patent Application Serial No. PCT/US2009/062722, A FRAME HAVING FRAME BLADES THAT PARTICIPATE IN COOLING MEMORY by Timothy Rau and Glenn C. Simon, PCT Patent Application Serial No. PCT/US2009/062760, and COOLING MEMORY MODULES USING WEDGE-SHAPED HEAT SPREADERS IN THERMAL CONTACT WITH COLD PLATE BLADES AND MEMORY MODULES by Timothy Rau, Glenn C. Simon, and Bryan Bolich, PCT Patent Application Serial No. PCT/US2009/062770. All related applications, and the present application, were filed on Oct. 30, 2009.

BACKGROUND

In the art of computing, individual memory integrated circuits (ICs) are often provided on a dual in-line memory module (DIMM). Often a heat spreader is attached over the memory ICs to dissipate the heat generated by the memory ICs across the length of the DIMM. However, it is often desirable to provide additional cooling.

Typically DIMM sockets are positioned on a motherboard in close proximity to each other, thereby simplifying routing of memory signal traces on the motherboard and minimizing space used by memory. A typical separation between adjacent DIMMs is 10 millimeters.

Two methods known in the art for providing additional cooling are air cooling and liquid cooling. Because of the close spacing of adjacent DIMMs, both methods often use space above the DIMM. Typically, air cooling uses a solid heat conducting metal or vapor chambers and associated tubing to conduct heat from the heat spreader to a heatsink above the DIMM.

Typically liquid cooling uses a suitable liquid, such as propylene glycol or ethylene glycol, mixed with water, to conduct heat from the heat spreader to the liquid. The heat is removed as the liquid is pumped through a channel associated with each DIMM. The liquid is then pumped to a heat exchanger, where heat is removed from the liquid. Typically, tubing is coupled to each DIMM along the top of the top of the DIMM.

BRIEF DESCRIPTION OF THE DRAWINGS

The Figures depict embodiments, implementations, and configurations of the invention, and not the invention itself.

DETAILED DESCRIPTION

Figure 1:
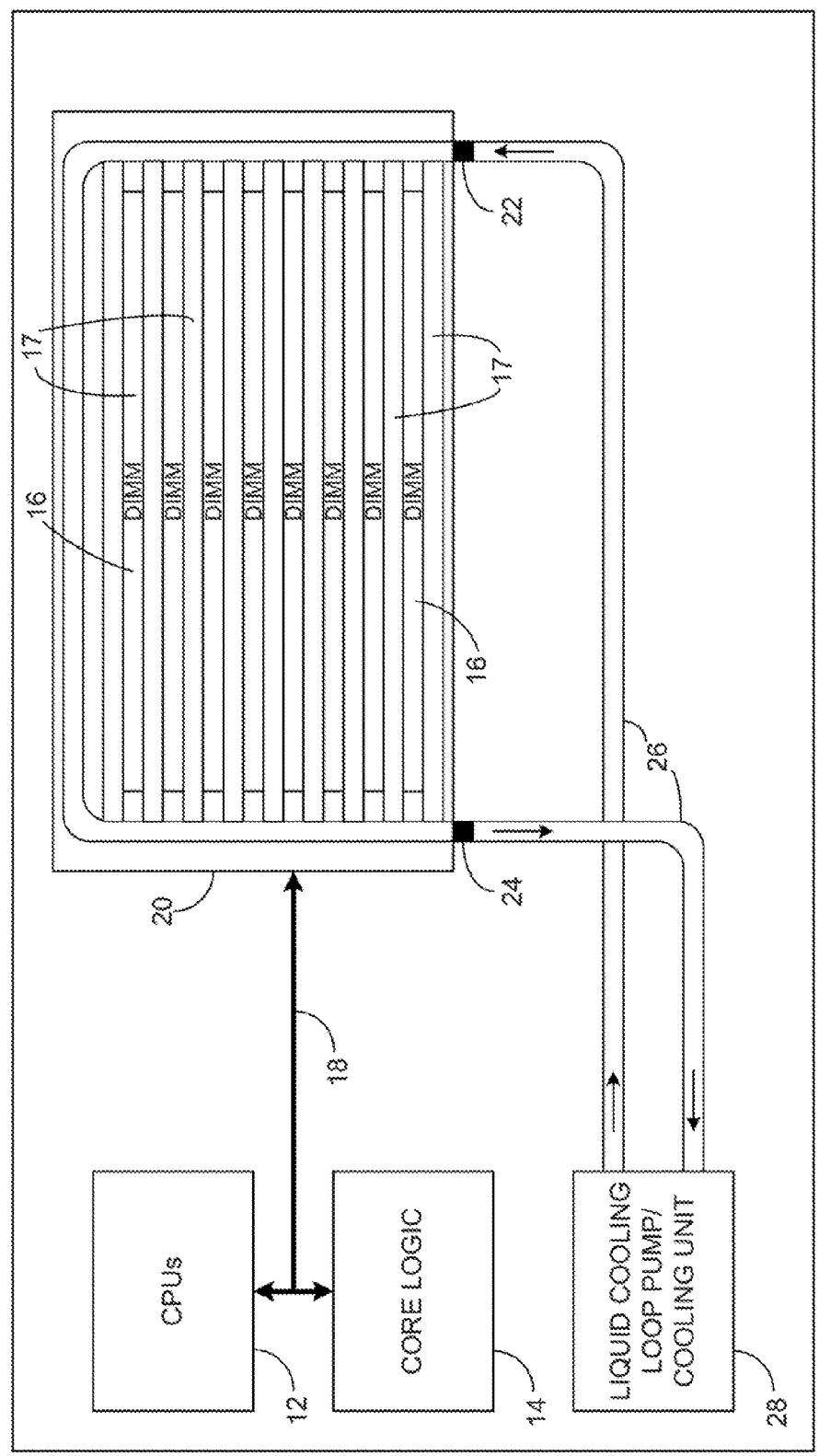
FIG. 1 is a functional block diagram of computer, having a cooling loop for cooling memory, in accordance with embodiments of the present invention.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

The Figures show many elements that are members of a plurality of similar elements. In general, individual elements of the plurality will be referenced by a numeral followed by a letter, while similar elements may be referenced collectively or generically by the numeral. For example, a group of blades may be referenced as blades 36, and an individual blade may be referenced as blade 36*d*, and a blade may be referenced generically as a blade 36.

As discussed in the Background section above, commercially available dual in-line memory module (DIMM) cooling solutions use space above the DIMMs to facilitate cooling. For air cooling, heatsinks are positioned above the DIMMs. Furthermore, cooling fans and air channels are often needed to move air over the heatsinks.

Commercially available liquid cooling solutions have a liquid inlet and outlet for each DIMM. The inlets and outlets, along with the associated tubing, consume space above the DIMMs. Furthermore, the need to connect tubing to the inlet and outlet of each DIMM makes assembly and servicing cumbersome.

In accordance with embodiments of the present invention, a cold plate having a liquid inlet and outlet is provided for each block of DIMMs. DIMM sockets are attached to a motherboard, system board, or other type of circuit board, and may have a standard spacing of 10 millimeters between adjacent DIMM sockets. The cold plate includes a series of blades that are positioned proximate the DIMM sockets such that a surface of a blade is positioned adjacent to a DIMM heat spreader when a DIMM is installed. Note that in other configurations, it is possible to use DIMMs without heat spreaders, with the surface of a blade in direct contact with the individual memory integrated circuits (ICs) on the DIMM.

Thermally conductive clips are placed over DIMMs and blades, thereby associating a blade with each DIMM. When the clips are installed, one side of each DIMM is cooled by direct contact with one side of the blade. The other side of the DIMM is cooled by contact with the clip, and a thermal conduction path through the clip, traversing the top of the DIMM and blade, to the other side of the blade, where the clip is in thermal contact with the other side of the blade. Embodiments of the present invention use little additional space compared to a standard bank of DIMMs of the prior art. Installation and servicing are simplified, since the clips are easily removed, and DIMMs can be added or removed, as in the prior art.

FIG. 1 is a functional block diagram of computer 10, in accordance with embodiments of the present invention. Details of the cold plate and clip structures, in accordance with embodiments of the present invention, will be shown in other figures.

Computer system 10 includes one or more central processing units (CPUs) 12, core logic 14, DIMMs 16, bus 18, cold plate and clips 20 (which includes blades/clips 17, liquid inlet 22, and liquid outlet 24), tubing 26, and liquid cooling loop pump/cooling unit 28.

CPUs 12 represents CPUs know in the art, such as several CPUs in discrete packages and multi-core CPUs in a single package. Core logic 14 represents core logic known in the art, such as a south bridge, a north bridge, memory controllers, I/O controllers, and the like. As the art of computing continues to advance, some of these functions, such as the memory controllers, are provided in the CPU package. Bus 18 represents one or more buses known in the art for connecting CPUs 12, core logic 14, and DIMMs 16.

Liquid cooling loop pump/cooling unit 28 pumps and cools liquid coolant using techniques know in the art. Any suitable coolant liquid, such as propylene glycol or ethylene glycol, mixed with water, can be used. The liquid may be cooled using a simple heat exchanger and fan, or by more advanced techniques, such as Peltier coolers or heat pumps. Also note that the function provided by unit 28 may be implemented at a variety of levels, such as in the computer system, within a rack, within a row of racks, or within a data center. It is also possible to integrate the liquid cooling function with a data center air conditioning system.

Note that it may also be desirable to cool CPUs 12 using a liquid cooling loop. In such a configuration, the loop can also flow through the CPUs, or a separate loop may be provided. For simplicity, the liquid cooling loop is only shown as cooling DIMMs 16. The liquid flows through tubing 26 in the direction show by the arrows in the tubing. The cold plate of cold plate and clips 20 includes an inlet 22 and an outlet 24, both of which are coupled to tubing 26.

The liquid cooling loop is in thermal contact with blades/clips 17. In FIG. 1, blades/clips 17 are shown generically in block diagram form, and include blades associated with the cold plate of cold plate and clips 20, and clips thermally coupling the DIMMs 16 to the blades, as will be shown in other figures and discussed in greater detail below.

Figure 2:
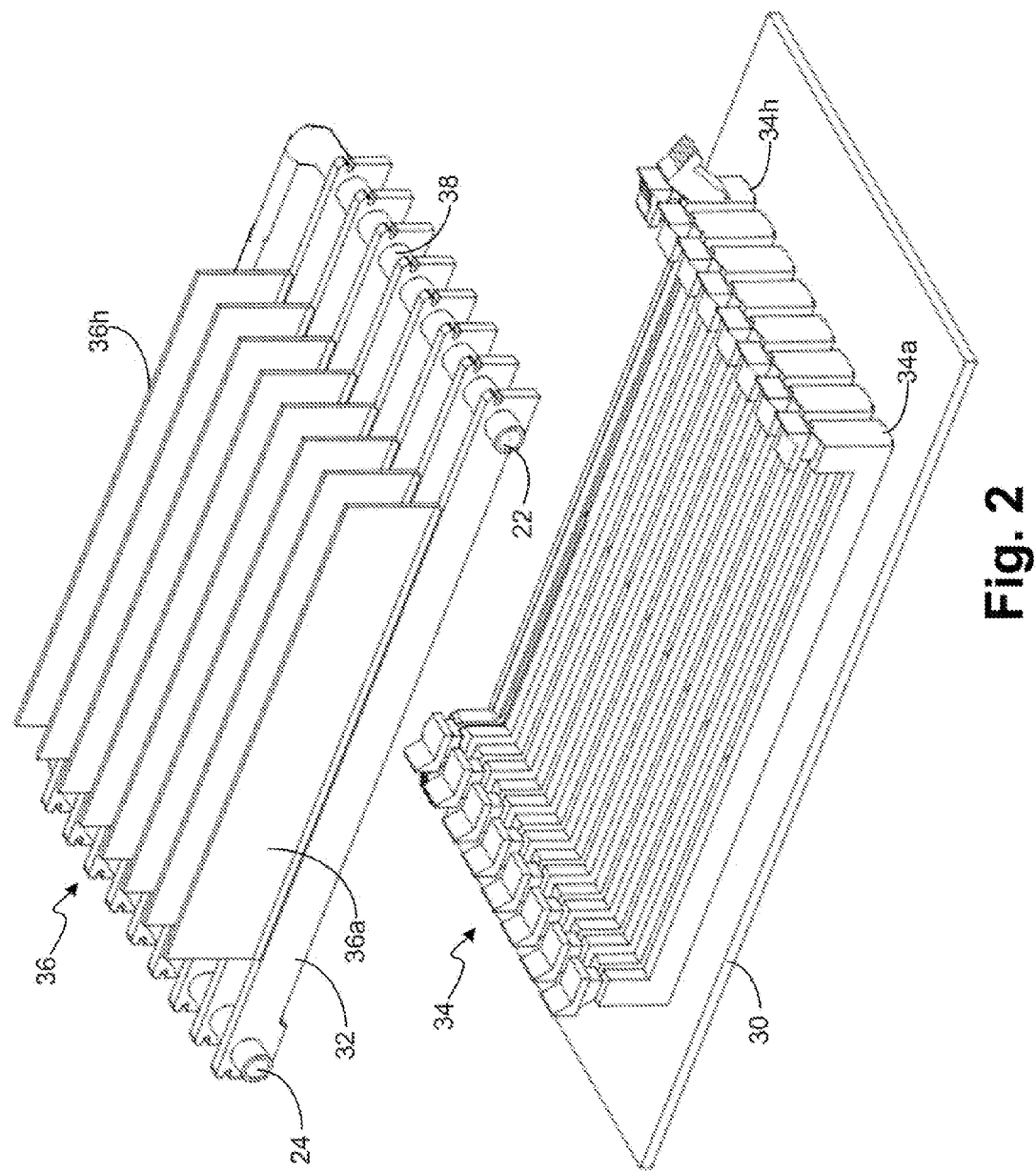
FIG. 2 shows a board, which may be a motherboard, system board, or other type of circuit hoard, a bank of memory modules sockets, and a cold plate having blades, in accordance with embodiments of the present invention.

FIG. 2 shows a board 30 and a cold plate 32, in accordance with embodiments of the present invention. Board 30 may be a motherboard, system board, or other type of circuit board. Board 30 includes DIMM sockets 34, which comprise individual DIMM sockets 34a-34h, with labels for DIMM sockets 34a and 34h shown in FIG. 2.

Cold plate 32 includes liquid inlet 22 and liquid outlet 24, as shown in FIG. 1. Cold plate 32 also includes blades 36, which comprise individual blades 36a-36h, with labels for blades 36a and 36h shown in FIG. 2. Cooling loop 38 includes inlet 22 and outlet 24, and ends of blades 36 are thermally coupled to cooling loop 38. The configurations shown in the figures herein support eight DIMMs. However, those skilled in the art will recognize that additional or fewer DIMMs may be supported by embodiments on the present invention. In a configuration supporting eight DIMMs as shown in FIG. 2, eight blades 36 are provided.

Figure 3:
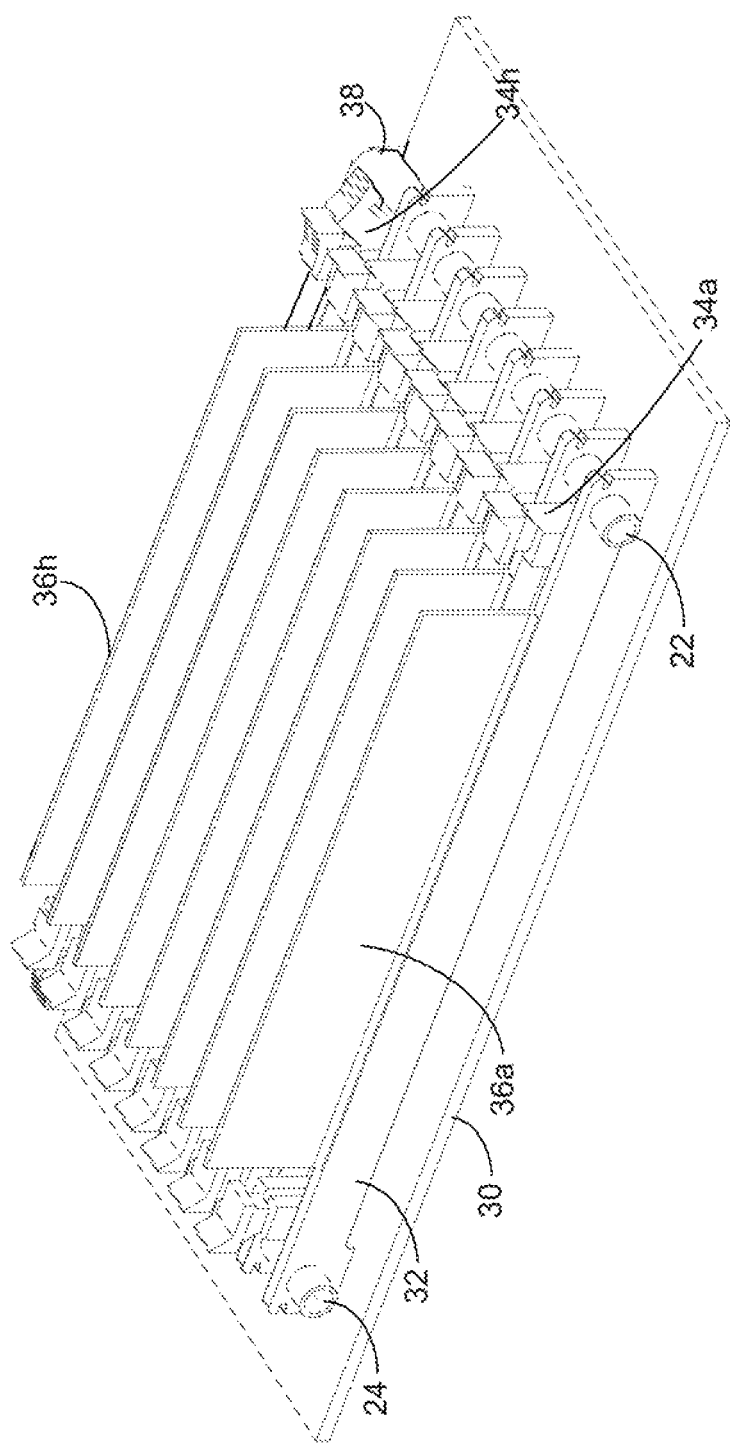
FIG. 3 shows the cold plate, board, and memory module sockets of FIG. 2 after the cold plate has been mounted to the board, in accordance with embodiments of the present invention.

FIG. 3 shows cold plate 32 and board 30 after cold plate 32 has been mounted to board 30. The blades 36a-36h of cold plate 32 are interleaved with DIMM sockets 34a and 34h such that each blade 36 is adjacent to a DIMM socket 34.

Figure 4:
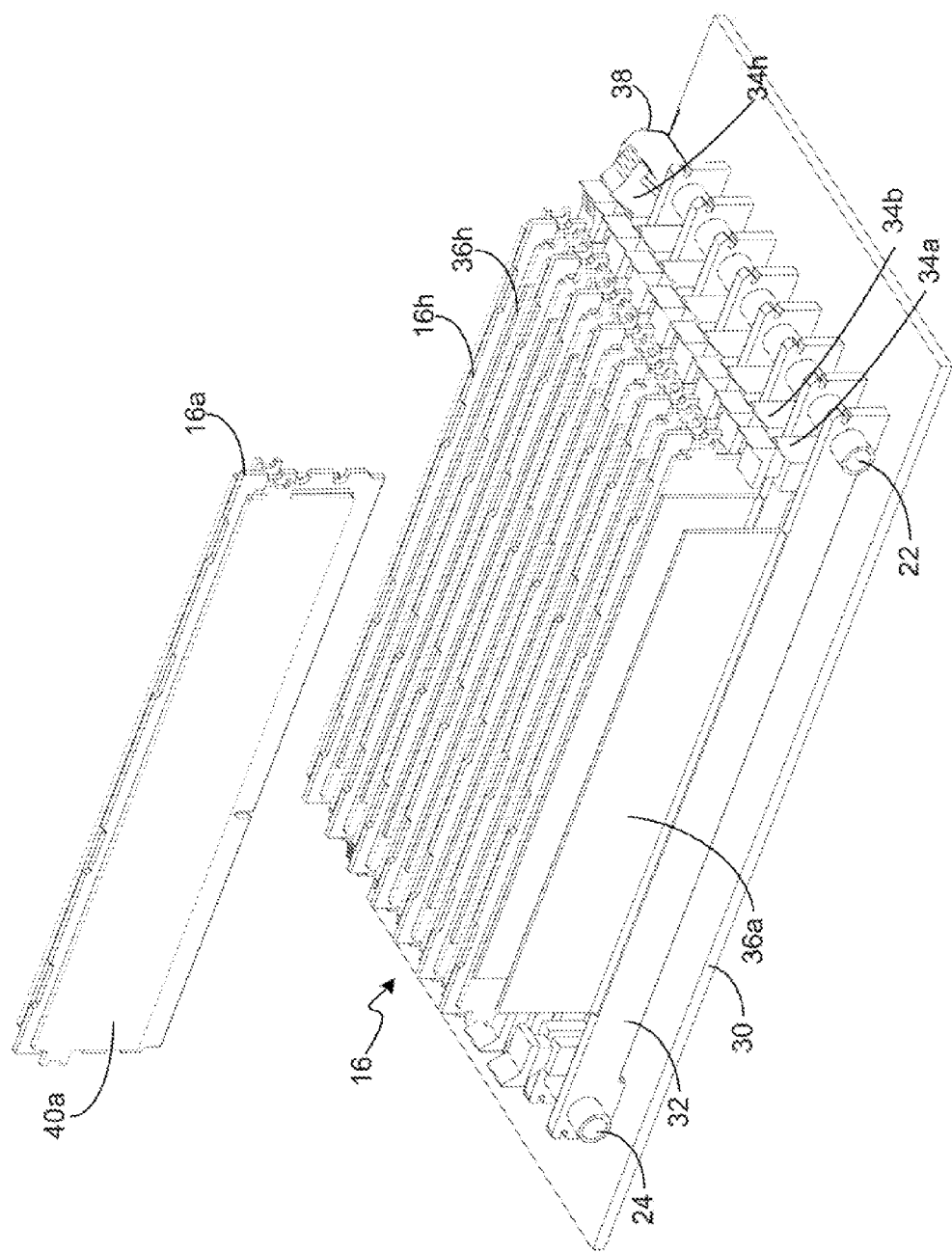
FIG. 4 shows the cold plate, board, and memory module sockets of FIG. 3, with memory modules installed in the memory module sockets, in accordance with embodiments of the present invention.

FIG. 4 shows cold plate 32 and board 30 after cold plate 32 has been mounted to board 30, as shown in FIG. 3, with DIMMs 16. DIMM 16a is shown uninstalled and above the DIMM socket 34a into which DIMM 16a will be installed, and DIMMs 16b-16h are shown installed in DIMM sockets 34b-34h, respectively. Also shown on DIMM 16a is heat spreader 40a. Heat spreaders are provided on all DIMMs. As mentioned above, embodiments of the present invention may also be used with DIMMs not having heat spreader.

Figure 5:
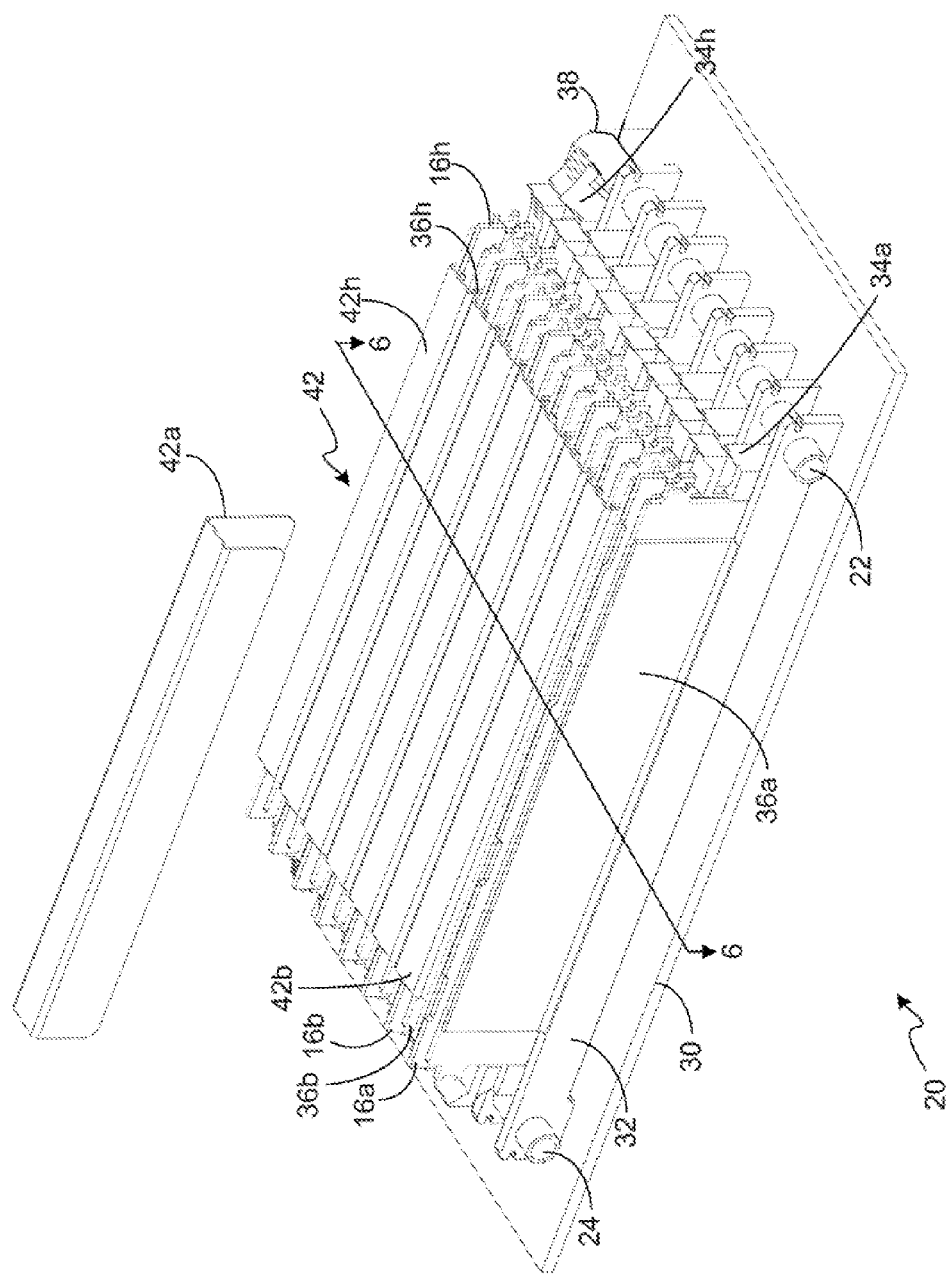
FIG. 5 shows the cold plate, board, memory module sockets, and memory modules of FIG. 4, with clips installed that couple memory modules to blades of the cold plate, in accordance with embodiments of the present invention.

FIG. 5 shows cold plate 32, and DIMMs 16 as in FIG. 4, with DIMM 16a installed in DIMM socket 34a. Also shown in FIG. 5 are clips 42. Clip 42a is shown above DIMM 16a before installation to better illustrate a clip 42, and clips 42b-42h are shown installed over DIMMs 16b-16h and blades 36b-36h, respectively. Clips 42 thermally couple DIMMs 16 to blades 36, as will be seen in greater detail below with reference to FIG. 6.

Figure 6:
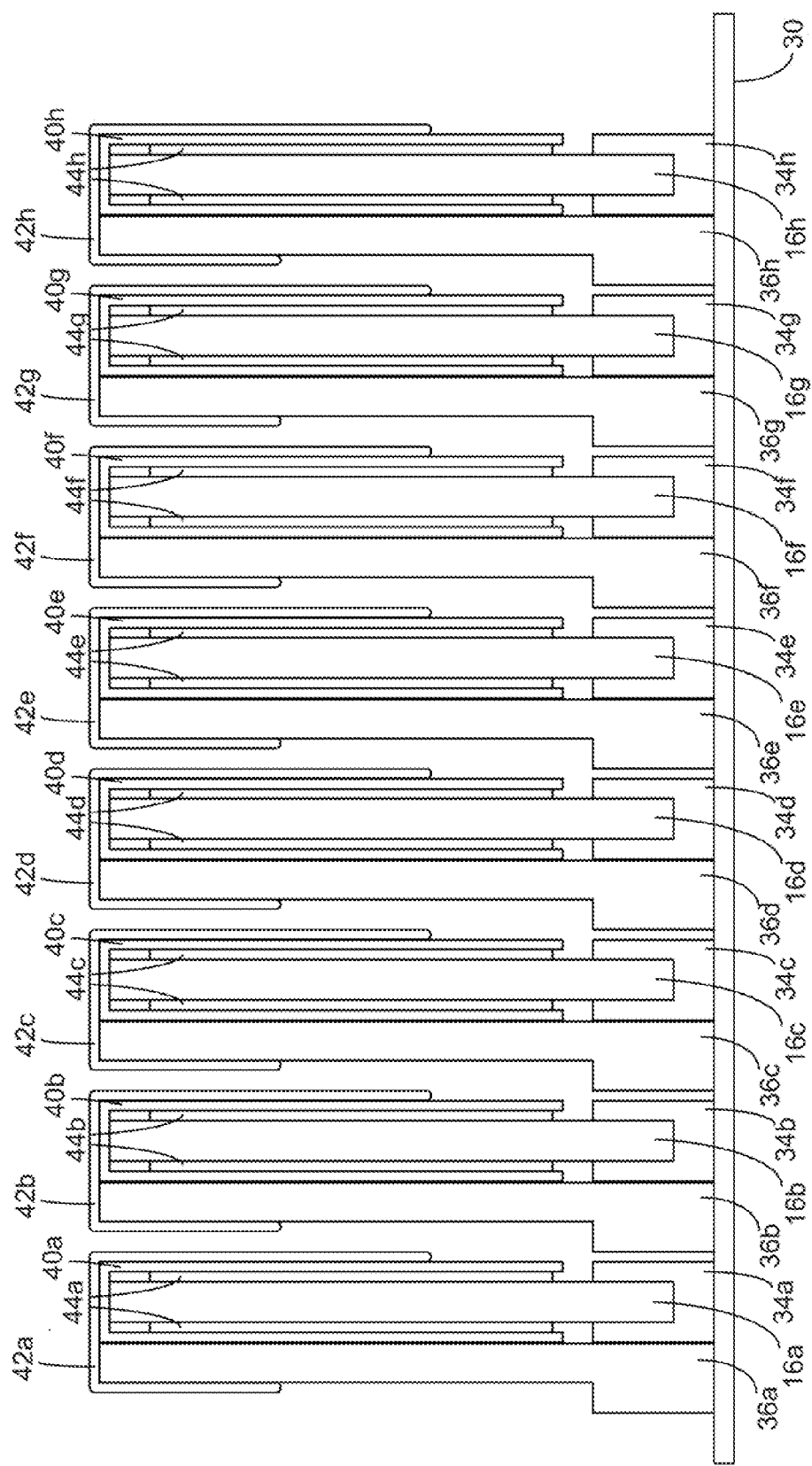
FIG. 6 is a sectional view taken along line 6-6 of FIG. 5 showing orientations of the memory modules, blades, and clips, in accordance with embodiments of the present invention.

FIG. 6 is a sectional view taken along line 6-6 of FIG. 5 showing the orientations of the DIMMs 16, blades 36, and clips 42. Note that the sectional view of FIG. 6 shows clip 42a installed.

In FIG. 6, dual sided DIMMs 16a-16h with heat spreaders 40a-40h are shown. Accordingly, each DIMM 16 is inserted in a DIMM socket 34, and includes memory ICs 44 (44a-44h) on both sides of the DIMM, and a heat spreader 40. Those skilled in the art will recognize that single-sided DIMMs may also be used with embodiments of the present invention, and DIMMs without heat spreaders may be used.

Note that clips 42 urge a first side of each DIMM 16 into thermal contact with a first side of a cold plate blade 36, thereby cooling the first sides of each DIMM 16. Each clip 42 is also in thermal with a second side of a DIMM 16 and a second side of a blade 36, thereby forming thermal conduction paths from the second sides of the DIMMs 16 to the second sides of the blades 36, and cooling the second sides of the DIMMs 16.

In the embodiment shown in FIGS. 1-5, cold plate 32 includes a single cooling loop 38 that traverses a portion of the perimeter of the DIMMs 16. Each blade 36 of cold plate 32 has two ends coupled to cooling loop 38, and blades 36 and clips 42 are made of a material having excellent thermal transfer properties, such as copper, aluminum, steel, and the like.

Figure 7:
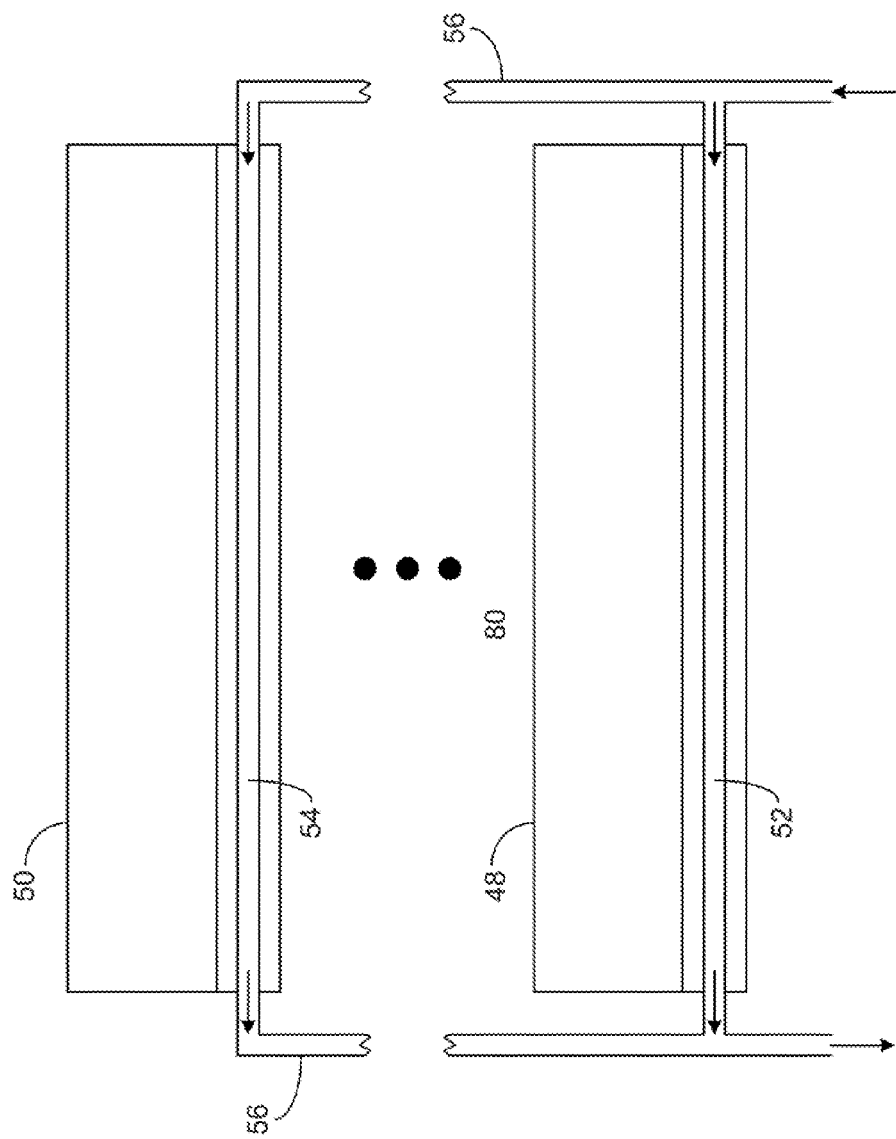
FIG. 7 is a block diagram of a cold plate wherein cooling liquid is routed through each blade, in accordance with embodiments of the present invention.

While the embodiment shown in FIGS. 1-5 having a cooling loop 38 that traverses a portion of the perimeter of DIMMs 16 provides acceptable cooling performance, in another embodiment, liquid is routed through each blade of the cold plate. FIG. 7 shows a block diagram of this embodiment.

In FIG. 7, blade 48 of cold plate 46 represents a first blade in a series of blades, and blade 50 represents a last blade in the series. Blade 48 includes channel 52, and blade 50 includes channel 54, with each channel carrying cooling liquid through the blade. Cooling loop 56 is configured to route cooling liquid through the channel of each blade. Accordingly, although the embodiment shown in FIG. 7 is more complex than the embodiments shown in FIGS. 1-5, the temperatures along the channels 52 and 54 tend to be more uniform.

Figure 8:
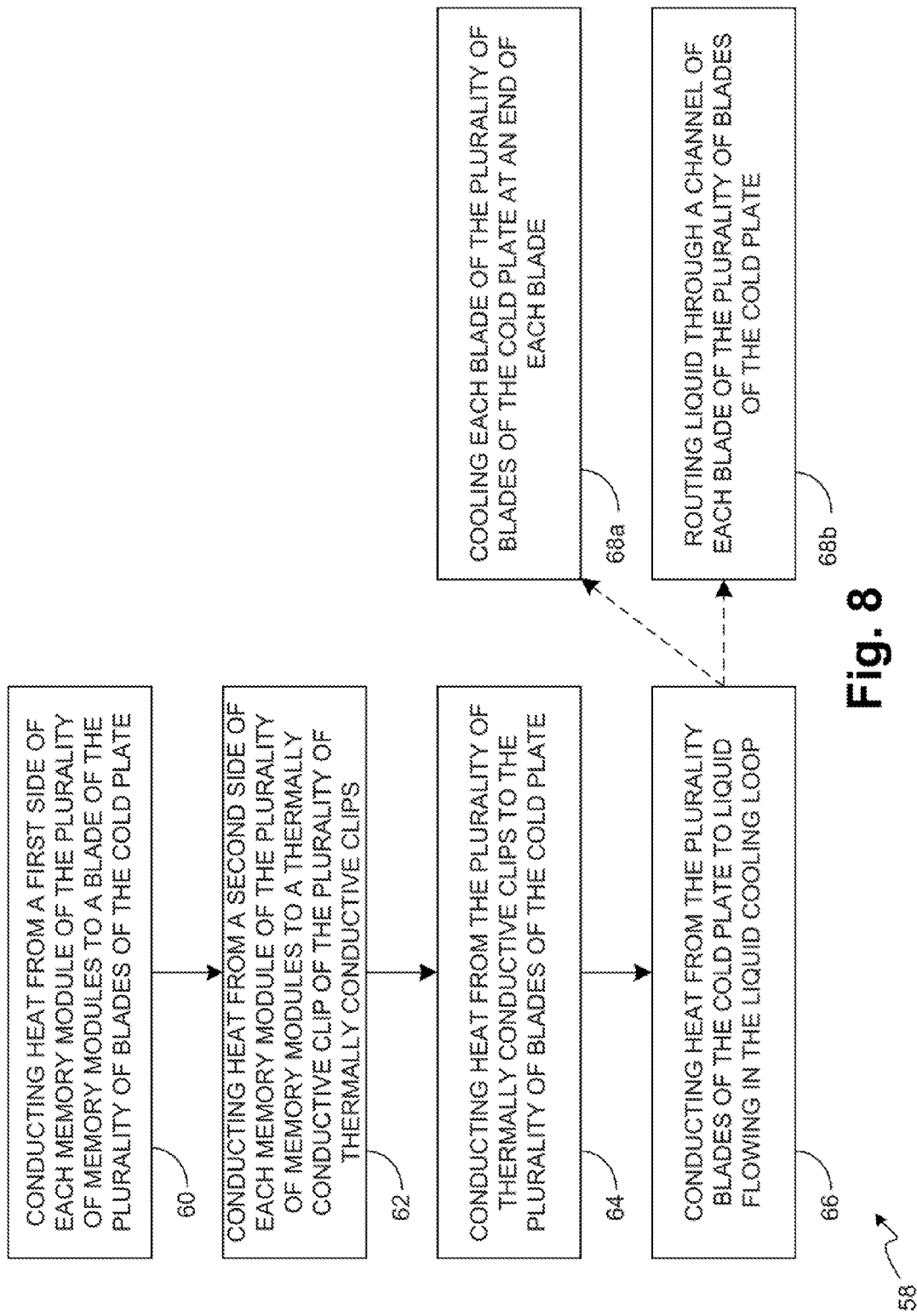
FIG. 8 is a flowchart illustrating how embodiments of the present invention cool memory modules.

FIG. 8 is a flowchart 58 illustrating how embodiments of the present invention cool DIMMs. In block 60, heat is conducted away from a first side of each DIMM to a blade of the cold plate. In block 62, heat is conducted away from a second side of each DIMM to a thermally conductive clip. In block 64, heat is conducted from the thermally conductive clips to the blades of the cold plate. Finally, in block 66 heat is conducted from the blades of the cold plate to the liquid flowing in the liquid cooling loop.

Block 68a, in conjunction with block 66, represents the embodiments shown in FIGS. 1-5. Accordingly, heat is conducted from the ends of the cold plate blades to the liquid cooling loop. Block 68b, in conjunction with block 66, represents the embodiment shown in FIG. 7. Accordingly, cooling liquid is routed through a channel of each blade of the cold plate.

Embodiments of the present invention provide many advantages over the prior art. Liquid cooling loop connections remain fixed as DIMMs are added or removed by simply first removing the clip from each DIMM. In contrast, prior art configurations provide liquid inlets and outlets for each DIMM, thereby causing the addition and removal of DIMMs to be cumbersome and time consuming. With embodiments of the present invention, a single inlet and outlet is provided for a block of DIMMs, and the inlet/outlet connections need only be coupled once during the manufacturing process.

Embodiments of the present invention require little extra space above the DIMMs, as is shown in the figures. Prior art air and liquid cooling solutions often consume space above the DIMMs. In addition, embodiments of the present invention have a system board "footprint" similar to prior art DIMM blocks. The only extra area required is the area reserved for the cooling loop along the sides of the DIMM block, and the area reserved for the inlets and outlets, and cooling loop connections. Also, space is saved by eliminating the need for cooling fans to direct airflow over the DIMMs. Of course, acoustic levels may also be reduced. Finally, embodiments of the present invention provide for simple memory reconfiguration, since the clips are easily removed from the DIMMs and cold plate blades, thereby providing access to the DIMMs In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus (20) for cooling memory modules (16) comprising:
   a cold plate (32, 46) comprising:
      a liquid cooling loop (38, 56) having an inlet (22) and an outlet (24); and
      a plurality of blades (36, 48, 50) thermally coupled to the cooling loop (38, 56), the plurality of blades (36, 48, 50) arranged to be interleaved with a plurality of memory modules (16); and
   a plurality of clips (42), with each clip (42a-42h) of the plurality of clips (42) attachable to a blade (36, 48, 50) of the plurality of blades (36, 48, 50) and a memory module (16) of the plurality of memory modules (16), thereby urging a first side of the memory module (16) into thermal contact with a first side of the blade (36, 48, 50), and forming a thermal conduction path from a second side of the memory module (16), through the clip (42), to a second side of the blade (36, 48, 50).

2. The apparatus (20) for cooling memory modules (16) according to claim 1 wherein the liquid cooling loop (38) traverses at least a portion of a perimeter of the cold plate (32) and is thermal contact with each blade (36a-36h) of the plurality of blades (36) of the cold plate (32) proximate ends of the blades (36a-36h).

3. The apparatus (20) for cooling memory modules (16) according to claim 1 wherein each blade (48, 50) of the plurality of blades of the cold plate (46) includes a channel (52, 54), and the liquid cooling loop (56) is coupled to each blade (48, 50) and cooling liquid is routed through the channel (52, 54) of each blade (48, 50).

4. A computer system (10) comprising
   one or more central processing units (12);
   a bank of memory modules (16);
   core logic (14);
   one or more busses (18) coupling the one or more central processing units (12), the bank of memory modules (16), and the core logic (14);
   a cold plate (32, 46) having a plurality of blades (36, 48, 50) interleaved with the memory modules (16);
   a plurality of clips (42), with each clip (42a-42h) of the plurality of clips (42) attached to a blade (36, 48, 50) of the plurality of blades (36, 48, 50) and a memory module (16) of the plurality of memory modules (16), thereby urging a first side of the memory module (16) into thermal contact with a first side of the blade (36, 48, 50), and forming a thermal conduction path from a second side of the memory module (16), through the clip (42), to a second side of the blade (36, 48, 50), thereby cooling the bank of memory modules (16);
   a liquid cooling loop (38, 56) having an inlet (22) and an outlet (24), and in thermal contact with the plurality of blades (36, 48, 50) of the cold plate (32, 46); and
   a liquid cooling loop pump and cooling unit (28) coupled (26) to the inlet (22) and the outlet (24) of the liquid cooling loop (38, 56).

5. The computer system (10) according to claim 4 wherein the liquid cooling loop (38) traverses at least a portion of a perimeter the cold plate (32) and is in thermal contact with each blade (36a-36h) proximate ends of the blades (36).

6. The computer system (10) according to claim 4 wherein each blade (48, 50) includes a channel (52, 54), and the liquid cooling loop (56) is coupled to each blade (48, 50) and cooling liquid is routed through the channel (52, 54) of each blade (48, 50).

7. A method (58) for removing heat from a plurality of memory modules cooled by a single liquid cooling loop coupled to interleaved blades of a cold plate, with a plurality of thermally conductive clips coupling memory modules to blades, comprising:
   conducting (60) heat from a first side of each memory module of the plurality of memory modules to a blade of the plurality of blades of the cold plate;
   conducting (62) heat from a second side of each memory module of the plurality of memory modules to a thermally conductive clip of the plurality of thermally conductive clips;
   conducting (64) heat from the plurality of thermally conductive clips to the plurality of blades of the cold plate; and
   conducting (66) heat from the plurality blades of the cold plate to liquid flowing in the liquid cooling loop.

8. The method according to claim 7 wherein conducting (66) heat from the plurality blades of the cold plate to liquid flowing in the liquid cooling loop includes cooling (68*a*) each blade of the plurality of blades of the cold plate at an end of each blade.

9. The method according to claim 7 wherein conducting (66) heat from the plurality blades of the cold plate to liquid flowing in the liquid cooling loop includes routing (68*b*) liquid through a channel of each blade of the plurality of blades of the cold plate.

\* \* \* \* \*